United States Patent [19]
Johnson

[11] Patent Number: 5,605,235
[45] Date of Patent: Feb. 25, 1997

[54] REMOTE CONTROL HOLDER

[76] Inventor: Rhonda D. Johnson, P.O. Box 220402, Anchorage, Ak. 99522

[21] Appl. No.: 366,736

[22] Filed: Dec. 30, 1994

[51] Int. Cl.⁶ .................................................. A47F 7/00
[52] U.S. Cl. ............................................... 211/13; 5/503.1
[58] Field of Search ............................. 211/13, 86, 87, 211/88; 5/503.1, 658, 507.1

[56] References Cited

U.S. PATENT DOCUMENTS

| | | | |
|---|---|---|---|
| D. 324,810 | 3/1992 | Moye, Sr. | |
| 1,686,002 | 10/1928 | Herzon | 5/503.1 X |
| 2,557,674 | 6/1951 | McRae | 5/503.1 X |
| 2,640,596 | 6/1953 | Reeder | 211/87 |
| 2,784,973 | 3/1957 | Nemec | 211/88 X |
| 2,979,120 | 4/1961 | Amburn | 211/88 X |
| 4,727,890 | 3/1988 | Vincent | 211/87 X |
| 4,831,673 | 5/1989 | Winckler | 5/503.1 |
| 5,192,042 | 3/1993 | Wotring et al. | |
| 5,195,634 | 3/1993 | Zaug | |
| 5,305,980 | 4/1994 | Le Blanc | |

Primary Examiner—Ramon O. Ramirez
Assistant Examiner—Sarah L. Purol
Attorney, Agent, or Firm—Terrance L. Siemens

[57] ABSTRACT

A holder for a plurality of remote control devices for controlling audiovisual equipment. The holder has an upwardly open pocket sufficiently wide to hold at least two controllers abreast. A planar support arm extends upwardly from the pocket, and includes a horizontal extension. The horizontal extension is inserted below the cushion of a cushioned chair or sofa, or below the mattress of a bed. The holder is readily installed in and removed from the furniture. The holder engages the furniture without penetration thereof, alteration thereof, or permanent attachment thereto. The holder is thus conveniently, unobtrusively, accessibly, and visibly stored close at hand, without occupying horizontal table space or requiring a separate piece of furniture for secure storage.

2 Claims, 2 Drawing Sheets

REMOTE CONTROL HOLDER

BACKGROUND OF THE INVENTION

1. Field of the Invention

The present invention relates to a holder for a hand held remote control device of the type typically employed to control audio visual equipment, such as televisions. The holder has a pocket for partially enclosing the remote control device, and also has a singular horizontal planar extension for engaging furniture. The remote control is thereby secured to furniture in a desired location.

2. Description of the Prior Art

The use of hand held remote control devices for starting, stopping, and otherwise controlling audiovisual equipment has greatly accelerated over time. Remote controllers are typically much smaller than the equipment they control, and thus can easily be hand held. Because their purpose is directed to remote operation, they are not only operated remotely from the controlled equipment, but are prone to be placed or stored in out of the way places. Typically many persons handle the remote controller in the course of a day. In addition the remote controller is often a delicate piece of electronic equipment prone to damage from impacts, water, or magnetic fields. The combination of remoteness from the controlled equipment plus the small size greatly increases the chances that the controller will be misplaced, lost, or possibly placed in a location in which it may be damaged.

To alleviate these problems, the prior art has introduced holders for these controllers. The holders typically both protect the controller and remain stationary since the function is merely to contain the controller.

A remote control holder described in U.S. Pat. No. 5,305,980, issued to James F. LeBlanc on Apr. 26, 1994, is directed to a device which is sturdy and also accommodates controllers of different dimensions. Control buttons of the controller are accessible even while the controller is contained within the holder.

U.S. Pat. No. 5,195,634, issued to Gregory P. Zaug on Mar. 23, 1993, describes a remote control holder which is more difficult to misplace and lose than the controller due to its greater size. A tether is provided to further render the controller less prone to temporary loss.

The device described in U.S. Pat. No. 5,192,042, issued to Randall C. Wotring et al. on Mar. 9, 1993, provides a single holder for a plurality of controllers. This is a somewhat special situation involving an entertainment center including a plurality of individual pieces of equipment, each having an individual controller.

Another multi-pocketed remote control holder is shown in U.S. Design Pat. No. 324,810, issued to Marvin T. Moye, Sr. on Mar. 24, 1992. This design, as well as all of the previous cited prior art patents, lacks the unique singular horizontal planar extension provided by the instant invention to fix the holder in a particular location on furniture.

None of the above inventions and patents, taken either singly or in combination, is seen to describe the instant invention as claimed.

SUMMARY OF THE INVENTION

The present invention counters the tendency to lose a remote controller by enabling the user to store the controller at a fixed, highly convenient location. It is significant that people generally sit or recline while enjoying audiovisual equipment.

The novel remote control holder has a pocket and a singular horizontal planar extension for attachment to a sofa, chair, or even bed occupied by a person using the audiovisual equipment. This is accomplished without attaching anything to the furniture, piercing the furniture, or otherwise altering the furniture. The novel holder is quickly removable from the furniture yet remains securely in position in normal use.

The improvement to remote control holders comprises a container pocket having a flat projection having extending at an right angle. The extending projection is easily inserted into and removed from conventional furniture as below a cushion or mattress. The remote controller thus remains close at hand, is unobtrusive and not in the way of other activities, and remains in a fixed place which is easy to remember. Yet the controller does not occupy valuable horizontal space on a table or countertop, where it would be subject to being accidentally knocked off, covered and hidden, or fouled by spillage of drinks.

The pocket is wide enough to hold several remote controllers abreast. The shallow profile, when viewed from the side, does not interfere with the legs of a user under ordinary conditions.

Additional advantages from this arrangement include proximity to a user's hands, and the fact that no table, shelf in a chest, or like horizontal surface is required, so that convenient, sheltered, yet accessible storage is not dependent upon furniture beyond that normally occupied by the user. The holder remains fully visible, so that a second user unfamiliar with the ways of a first user can immediately spot the controller when it is stored. This advantage may be enhanced by forming the holder from brightly colored plastic. The artisan will recognize that it may be desirable for some to form the holder of clear unobtrusive plastic for the purpose of blending with the surrounding decor.

Accordingly, it is a principal object of the invention to provide a remote controller holder which readily engages furniture which is occupied by the user of audiovisual equipment.

It is another object of the invention to locate the holder unobtrusively yet accessibly.

It is a further object of the invention to store a remote controller independently of furniture other than that occupied by a user.

It is an additional object of the invention to avoid requiring penetration of, permanent addition to or alteration of the furniture supporting the remote control holder.

It is again an object of the invention to hold several remote controllers.

Another object of the invention is to provide a remote control holder that is easily attached to and removed from furniture.

Yet another object of the invention is to avoid occupying space of horizontal supporting surfaces of furniture.

Still another object of the invention is to locate the holder in a fully visible position.

It is a major goal of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENT

Figure 1:
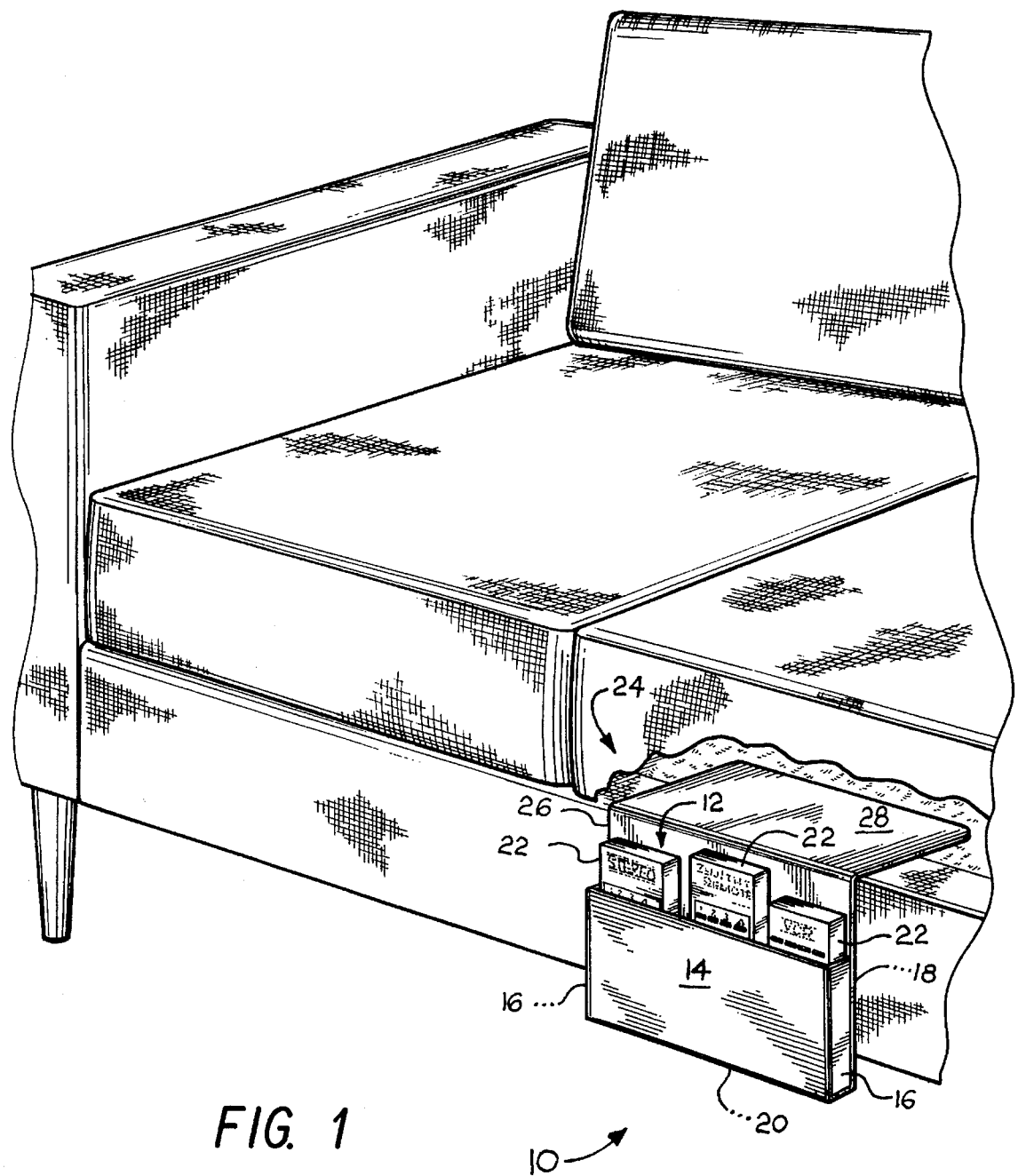
FIG. 1 is an environmental, perspective view of the remote control holder in place in a sofa, the sofa partially broken away to fully reveal construction of the holder.

The novel remote control holder 10 is seen installed in a sofa 12 in FIG. 1. Holder 10 includes a pocket 12 having vertical front, side, and rear walls 14, 16, 18, and a bottom wall 20. Pocket 12 is therefore upwardly open to facilitate insertion thereinto and storage of a remote controller 22.

A support arm 24 projects upwardly from pocket 12, and comprises a vertical section 26 and a horizontal extension 28. While the precise configuration of support arm 24 may vary, it is preferred that it be substantially planar. This will cause the orientation of pocket 12 to remain upright, resisting any tendency to incline when a person sits down in the furniture, arises, or shifts his or her weight. Stability and durability are enhanced by forming vertical section 26 planar also.

Figure 3:
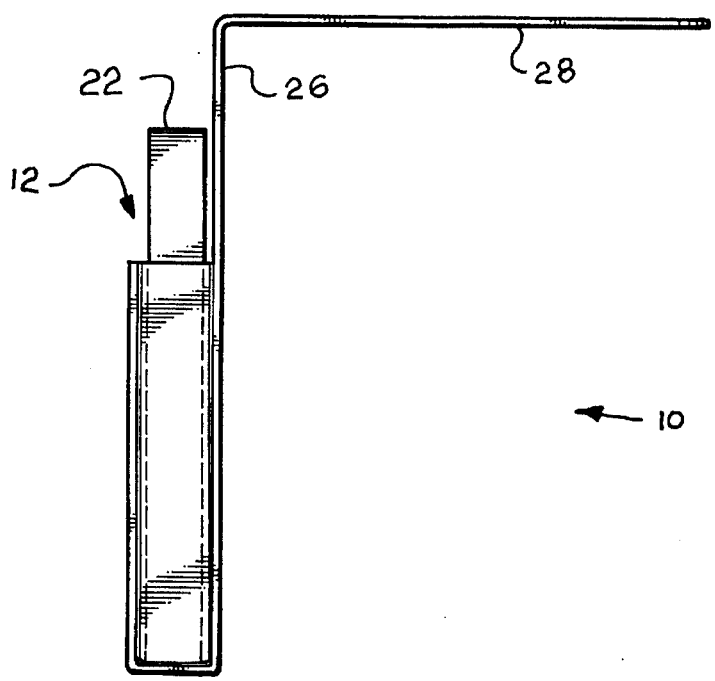
FIG. 3 is an environmental, side elevational view of the holder holding a controller, drawn to enlarged scale.

As will be seen with reference to FIG. 3, horizontal extension 28 projects from vertical section 26 in a direction opposite the direction of projection of the opening of pocket 12, so that access to pocket 12 is from the front. Of course, it would be possible to reverse the location of pocket 12 with respect to support arm horizontal extension 28, which would reduce access to pocket 12. This reduced access may be desirable in those households including very young children, who might otherwise remove and lose the remote controller.

Figure 2:
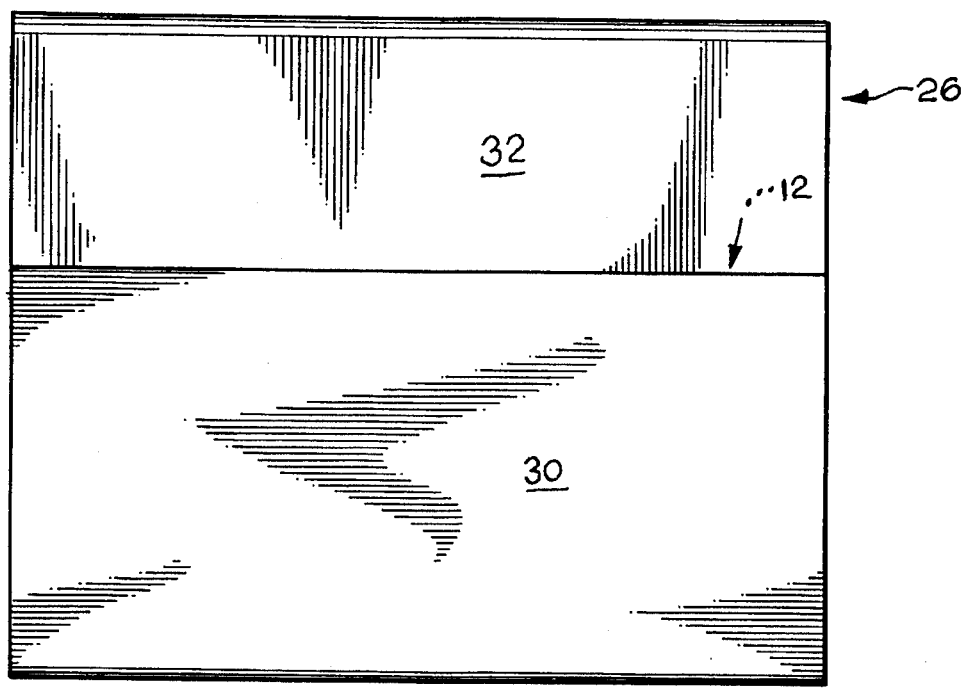
FIG. 2 is a front view of the holder, drawn to enlarged scale.

FIG. 2 illustrates the width of both pocket 12 and of support arm vertical section 26. The respective surfaces illustrated herein will be referred to as width surfaces 30 and 32, respectively. The magnitude of width surface 30, and hence the overall width of pocket 12 is sufficient in the preferred embodiment to accommodate three controllers 22. Width surfaces 30 and 32 are parallel, as better seen in FIG. 3. This characteristic helps assure the stability of holder 10 when people sit down on or arise from the furniture.

The substantially planar nature of support arm is preferred for several reasons. One is that this construction imparts adequate strength for purposes of resisting deformation and for durability. Also, this configuration will best cooperate with the yielding nature of cushions and mattresses in that weight and similar loads imposed from above will be adequate distributed so as to maintain the position of support arm 24 as it engages the furniture. A flat member is further least likely to be sensed or felt through the cushion, should the latter be thin or worn.

Therefore, while support arm 24 may be formed from rod stock or wire, or may be formed in still other configurations, it is preferred that it be substantially planar.

While remote control holder 10 may be made to any desired dimensions, it is preferred that pocket 12 be one inch (2.5 cm) from surface 30 to surface 32, and that width surfaces 30 and 32 be ten inches (25 cm) from right to left, as depicted in FIG. 2. Horizontal extension 28 extends six inches (15 cm) from vertical section 26, and the overall height of holder 10, as viewed in FIG. 2, should be eight inches (20 cm), the height of pocket 12 being five inches (12.5 cm). These dimensions will enable ready placement of holder 10 within furniture, and will accommodate three typical remote controllers inserted abreast, as seen in FIG. 1.

It is to be understood that the present invention is not limited to the embodiments described above, but encompasses any and all embodiments within the scope of the following claims.

I claim:

1. A monolithic holder for supporting remote controllers of audiovisual equipment on household furniture between top and supporting cushions, said holder comprising:

a pocket having a rear wall being extended higher than the remaining walls and an opening at the top for holding the remote controllers, and a support arm comprising a singular horizontal extension projecting from the top of said rear wall of the pocket, said singular horizontal extension of said support arm being substantially planar, smooth, and unbroken, said singular horizontal planar extension of said support arm projecting in a perpendicular direction of the rear wall of said pocket, wherein said horizontal planar member slips under the top cushion and above the supporting cushion of the furniture so as to hold the remote controllers entirely beneath an upper surface of the supporting cushion.

2. The monolithic holder according to claim 1, said singular horizontal planar extension of said support ann projecting in a perpendicular direction to the rear wall of said pocket, wherein said singular horizontal planar extension allows insertion and removal between two cushions of furniture without tearing or ruining the furniture, said singular horizontal extension is held in place by the weight of the top cushion and is supported by the surface of the supporting cushion.

\* \* \* \* \*